US008606696B1

(12) United States Patent
Halpern

(10) Patent No.: US 8,606,696 B1
(45) Date of Patent: Dec. 10, 2013

(54) ASSESSING CONSUMER PURCHASE BEHAVIOR IN MAKING A FINANCIAL CONTRACT AUTHORIZATION DECISION

(75) Inventor: Paul Halpern, Wynnewood, PA (US)

(73) Assignee: Simplexity, Inc., Reston, VA (US)

( * ) Notice: Subject to any disclaimer, the term of this patent is extended or adjusted under 35 U.S.C. 154(b) by 0 days.

(21) Appl. No.: 13/610,754

(22) Filed: Sep. 11, 2012

(51) Int. Cl.
*G06Q 40/00* (2012.01)

(52) U.S. Cl.
USPC ............. 705/38; 705/7.11; 705/7.15; 705/35; 705/7.1; 455/405; 455/411; 379/91.01

(58) Field of Classification Search
USPC ........... 705/7.11, 10, 35, 38, 7.15; 379/91.01; 455/411, 405
See application file for complete search history.

(56) References Cited

U.S. PATENT DOCUMENTS

| | | | | |
|---|---|---|---|---|
| 4,958,368 | A * | 9/1990 | Parker | 379/91.01 |
| 7,058,386 | B2 * | 6/2006 | McGregor et al. | 455/405 |
| 8,090,617 | B1 * | 1/2012 | Ladd et al. | 705/26.35 |
| 2011/0054981 | A1 * | 3/2011 | Faith et al. | 705/10 |
| 2011/0313900 | A1 * | 12/2011 | Falkenborg et al. | 705/30 |
| 2012/0296806 | A1 * | 11/2012 | Abrahams et al. | 705/38 |

OTHER PUBLICATIONS

Erkki K. Laitinen Extension of Break-even analysis for payment default prediction evidence from small firms; Investment Management and Financial Inovations, vol. 8, Iss. 4, 2011.*
Alchemy Technologies (Pty) Limited "Probability of Default calculator"; 2009.*
N The Court of Appeal of the State of California Second Appellate District Division Three; *Saul Deleon* (Plaintiff and Appellant, v. *Verizon Wireless, LLC*, (Defendant and Respondent); Jul. 10, 2012.*
George Mason University; ITU Telecom Administration; Form: Cellular Equipment Approval is a for for new service or upgrade of current phone; Feb. 2012.*
Credit Optics Overview, Id: Analytics, 2 pages (2012). http://www.idanalytics.com/assets/pdf/CreditOptics50_Datasheet_June2012.pdf [last accessed Jun. 24, 2013].
Network Overview, FICO, 4 pages (2013). http://www.fico.com/en/Products/DMTools/Pages/FICO-Network.aspx [last accessed Jun. 24, 2013].
Customer Connection Solution, FICO, 4 pages (2013). http://www.fico.com/enProducts/DMTools/Pages/FICOCustomerConnect.aspx [last accessed Jun. 24, 2013].

* cited by examiner

*Primary Examiner* — Harish T Dass
(74) *Attorney, Agent, or Firm* — Choate, Hall & Stewart LLP; William R. Haulbrook

(57) ABSTRACT

A method includes: receiving a request corresponding to a prospective customer for at least one of a new service contract and sale of a product, the request including purchaser data specific to the purchaser, and new transaction data; determining historic data for a plurality of past transactions based at least in part on the purchaser data and one or more characteristics of the at least one of the new service contract and sale of the new product, the historic data for each past transaction including respective purchaser data, respective transaction data, and respective outcome data; determining historic risk data related to the plurality of past transactions; determining a risk prediction of the request based at least in part upon the historic risk data; and determining an authorization decision based at least in part upon the risk prediction, wherein the authorization decision comprises an approval or a denial of the request.

30 Claims, 9 Drawing Sheets

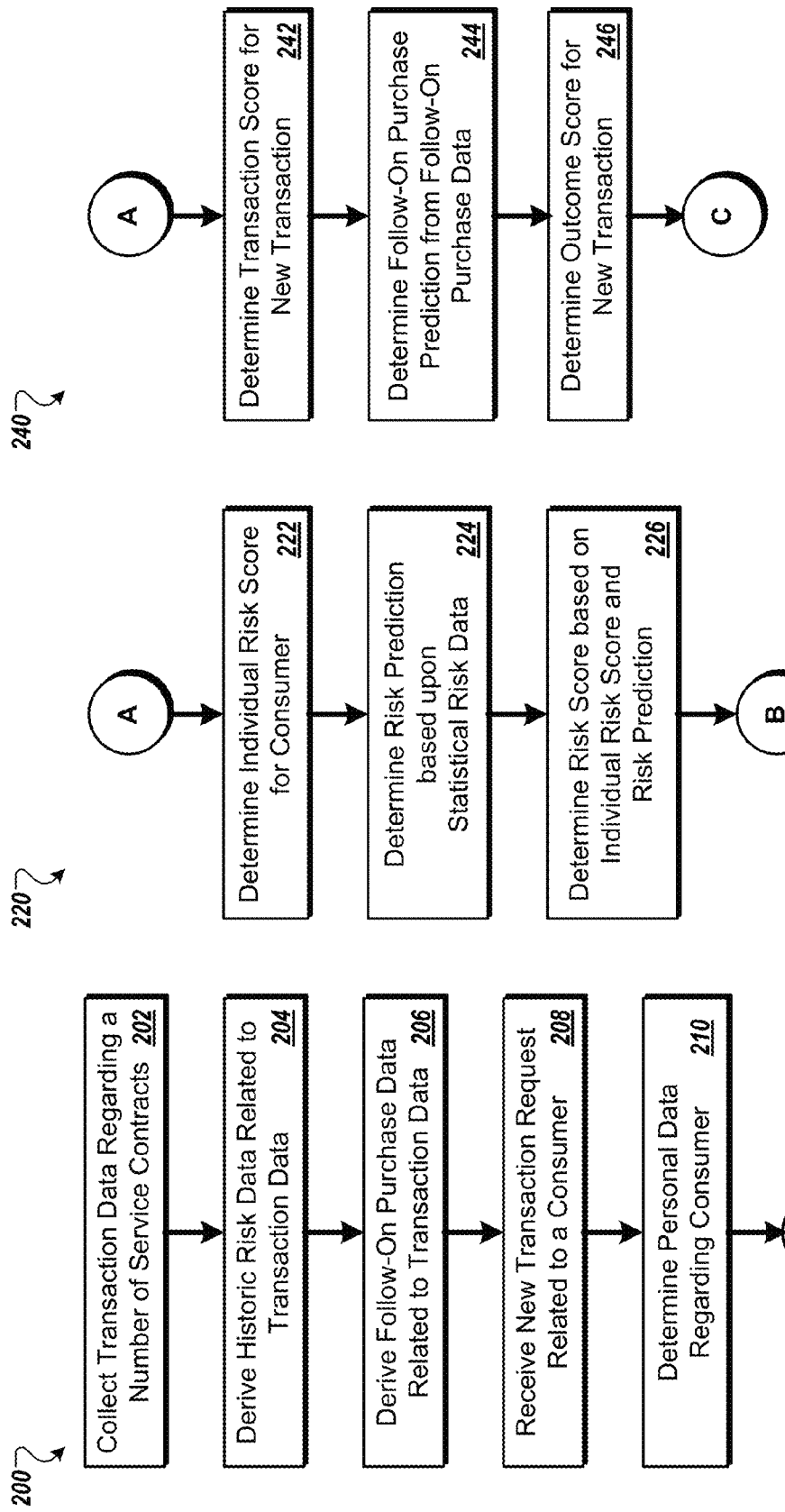

ASSESSING CONSUMER PURCHASE BEHAVIOR IN MAKING A FINANCIAL CONTRACT AUTHORIZATION DECISION

INCORPORATION BY REFERENCE

U.S. application Ser. No. 13/610,741, filed on Sep. 11, 2012, is hereby incorporated by reference in its entirety.

BACKGROUND

In some transactions, a broker may incur risk in facilitating the establishment of a long term financial contract commitment. For example, a purchaser may fail to fulfill a commitment to future payments towards the financial contract, causing the broker to incur a loss in relation to the transaction. In some consumer markets, such as home security monitoring, cellular/mobile communications, automobile sales, and furniture sales, a broker may facilitate the establishment of a contract where product or equipment is initially provided to a purchaser at a financial loss to the broker. For example, a purchaser may enter a long term financial contract with a service provider or other entity, represented by the broker, whereby the broker depends upon the purchaser's fulfillment of the long term financial contract with the service provider to derive profit from the transaction.

SUMMARY

In accordance with example embodiments, a method includes: receiving a request corresponding to a prospective customer for at least one of (a) a new service contract and (b) sale of a product, wherein the request comprises purchaser data specific to the prospective purchaser, and new transaction data; determining historic data for a plurality of past transactions based at least in part on the purchaser data and one or more characteristics of the at least one of (a) the new service contract and (b) sale of the new product, wherein the historic data for each past transaction comprises respective purchaser data, respective transaction data, and respective outcome data; determining, by a processor of a computing device, based at least in part on the respective outcome data, historic profitability data related to the plurality of past transactions; determining, by the processor, a profitability prediction of the request, wherein the profitability prediction is based at least in part upon the historic profitability data; determining, by the processor, a profit estimate of the request, wherein the profit estimate is based at least in part upon a cost associated with a subsidization of the at least one of (a) the new service contract and (b) sale of the new product; and determining, by the processor, an authorization decision based at least in part on the profitability prediction, wherein the authorization decision comprises an approval or a denial of the request.

The method may further include identifying, by the processor, a profit threshold.

The method may further include comparing, by the processor, the profitability prediction to the profit threshold.

The method may further include determining, by the processor, at least in part based on the comparison of the predicted profit to the profit threshold, that the request should be approved or denied.

The historic data may include a likelihood of default.

The profitability prediction may correspond at least in part to a profit margin.

The profitability prediction may be based at least in part on a credit score.

The method may further include determining, by the processor, follow-on purchase statistical data related to the plurality of past service contracts; and determining, by the processor, a future purchase prediction based in part upon the follow-on purchase statistical data.

The determining the profit estimate may further include estimating future profit based upon the future purchase prediction.

The determining the authorization decision may include calculating a score.

The authorization decision may include an approval, and determining the profit estimate may be determined based further in part on a compensation amount provided by a service provider in return for authorizing the new service contract.

The service provider may be a consumer telecommunications provider.

The method may further include determining a cost detriment associated with a potential default of the new service contract.

The determining the authorization decision may include determining, by the processor, a maximum probability of default, wherein the maximum probability of default may be a risk ratio comprising the profit estimate and the cost detriment, and the maximum probability of default may be a point at which the new service contract would at least break even in profitability.

The determining the authorization decision may include: determining, by the processor, a minimum acceptable profitability, wherein the minimum acceptable profitability may be based at least in part on the profit estimate, the cost detriment, and the risk prediction; and determining, by the processor, whether the profit estimate is above the minimum acceptable profitability.

In accordance with example embodiments, a method includes: receiving a request for a new service contract corresponding to a prospective purchaser in connection with subsidized equipment, wherein the request for a new service contract comprises purchaser data specific to the prospective purchaser, and new transaction data; determining historic data for a plurality of past service contracts based at least in part on the purchaser data, one or more characteristics of the subsidized equipment, and one or more characteristics of the new service contact, wherein each service contract of the plurality of past service contracts comprises respective purchaser data, respective transaction data, and respective outcome data; determining, by a processor of a computing device, based at least in part on the respective outcome data, historic profitability data related to the plurality of past service contracts; determining, by the processor, a profitability prediction of the request, wherein the profitability prediction is based at least in part upon the historic profitability data; determining, by the processor, a profit estimate of the request, wherein the profit estimate is based at least in part upon a cost associated with the subsidization of the subsidized equipment; and determining, by the processor, an authorization decision based at least in part on the profitability prediction, wherein the authorization decision comprises one of an approval or a denial of the new service contract.

The method may further include identifying, by the processor, a profit threshold.

The method may further include comparing, by the processor, the profitability prediction to the profit threshold.

The method may further include determining, by the processor, at least in part based on the comparison of the predicted profit to the profit threshold, that the request should be approved or denied.

The historic data may include a likelihood of default.

The profitability prediction may correspond at least in part to a profit margin.

The profitability prediction may be based at least in part on a credit score.

The method may further include: determining, by the processor, follow-on purchase statistical data related to the plurality of past service contracts; and determining, by the processor, a future purchase prediction based in part upon the follow-on purchase statistical data.

The determining the profit estimate may further include estimating future profit based upon the future purchase prediction.

The determining the authorization decision may include calculating a score.

The authorization decision may include an approval, and the determining the profit estimate may be determined based further in part on a compensation amount provided by a service provider in return for authorizing the new service contract.

The service provider may be a consumer telecommunications provider.

The method may further include determining a cost detriment associated with a potential default of the new service contract.

The determining the authorization decision may include determining, by the processor, a maximum probability of default, wherein the maximum probability of default may be a risk ratio comprising the profit estimate and the cost detriment, and the maximum probability of default may include a point at which the new service contract would at least break even in profitability.

The determining the authorization decision may include: determining, by the processor, a minimum acceptable profitability, wherein the minimum acceptable profitability may be based at least in part on the profit estimate, the cost detriment, and the risk prediction; and determining, by the processor, whether the profit estimate is above the minimum acceptable profitability.

In accordance with example embodiments, a method includes: receiving a request corresponding to a prospective customer for at least one of (a) a new service contract and (b) sale of a product, wherein the request comprises purchaser data specific to the prospective purchaser, and new transaction data; determining historic data for a plurality of past transactions based at least in part on the purchaser data and one or more characteristics of the at least one of (a) the new service contract and (b) sale of the new product, wherein the historic data for each past transaction comprises respective purchaser data, respective transaction data, and respective outcome data; determining, by a processor of a computing device, historic risk data related to the plurality of past transactions; determining, by the processor, a risk prediction of the request, wherein the risk prediction is based at least in part upon the historic risk data; and determining, by the processor, an authorization decision based at least in part upon the risk prediction, wherein the authorization decision comprises an approval or a denial of the request.

The method may further include identifying, by the processor, a risk threshold.

The risk threshold may correspond at least in part to a value at which the at least one of (a) the new service contract and (b) the sale of a product is expected to result in no profit and no loss.

The method may further include comparing, by the processor, the risk prediction to the risk threshold.

The method may further include determining, by the processor, based at least in part on the comparison of the risk prediction to the risk threshold, that the request should be approved or denied.

The historic risk data may include a likelihood of default.

The risk prediction may be based at least in part on a credit score.

The method may further include: determining, by the processor, follow-on purchase statistical data related to the plurality of past service contracts; and determining, by the processor, a future purchase prediction based at least in part upon the follow-on purchase statistical data.

The method may further include determining, by the processor, a profit estimate of the request.

The determining the profit estimate may further include estimating future profit based upon the future purchase prediction.

The determining the authorization decision may include determining a score.

The method may further include determining a cost detriment associated with a potential default of the new service contract.

The determining the authorization decision may include determining, by the processor, a maximum probability of default, wherein the maximum probability of default may be a risk ratio comprising the profit estimate and the cost detriment, and the maximum probability of default may include a point at which the at least one of (a) the new service contract and (b) sale of the product would at least break even in profitability.

The determining the authorization decision may include: determining, by the processor, a minimum acceptable profitability, wherein the minimum acceptable profitability may be based at least in part on the profit estimate, the cost detriment, and the risk prediction; and determining, by the processor, whether the profit estimate is above the minimum acceptable profitability.

In accordance with example embodiments, a method includes: receiving a request for a new service contract corresponding to a prospective purchaser in connection with subsidized equipment, wherein the request for a new service contract comprises purchaser data specific to the prospective purchaser, and new transaction data; determining historic data a plurality of service contracts based at least in part on the purchaser data, one or more characteristics of the subsidized equipment, and one or more characteristics of the new service contact, wherein each service contract of the plurality of past service contracts comprises respective purchaser data, respective transaction data and respective outcome data; determining, by a processor of a computing device, historic risk data related to the plurality of past service contracts; determining, by the processor, a risk prediction of the request, wherein the risk prediction is based at least in part upon the historic risk data; and determining, by the processor, an authorization decision based at least in part upon the risk prediction, wherein the authorization decision comprises one of an approval or a denial of the new service contract.

The method may further include identifying, by the processor, a risk threshold.

The risk threshold may correspond at least in part to a value at which the new service contract is expected to generate no profit and no loss.

The method may further include comparing, by the processor, the risk prediction to the risk threshold.

The method may further include determining, by the processor, based at least in part on the comparison of the risk prediction to the risk threshold, that the request should be approved or denied.

The historic risk data may include a likelihood of default.

The risk prediction may be based at least in part on a credit score.

The method may further include: determining, by the processor, follow-on purchase statistical data related to the plurality of past service contracts; and determining, by the processor, a future purchase prediction based at least in part upon the follow-on purchase statistical data.

The method may further include determining, by the processor, a profit estimate of the request.

The determining the profit estimate may further include estimating future profit based upon the future purchase prediction.

The determining the authorization decision may include determining a score.

The authorization decision may include an approval, and the determining of the risk estimate may be based further in part upon a compensation amount provided by a service provider in return for authorizing the new service contract.

The service provider may be a consumer telecommunications provider.

The method may further include determining a cost detriment associated with a potential default of the new service contract.

The determining the authorization decision may include determining, by the processor, a maximum probability of default, wherein the maximum probability of default may be a risk ratio comprising the profit estimate and the cost detriment, and the maximum probability of default may include a point at which the new service contract would at least break even in profitability.

The determining the authorization decision may include: determining, by the processor, a minimum acceptable profitability, wherein the minimum acceptable profitability may be based at least in part on the profit estimate, the cost detriment, and the risk prediction; and determining, by the processor, whether the profit estimate is above the minimum acceptable profitability.

Further features and aspects of example implementations are described in more detail below with reference to the appended Figures.

BRIEF DESCRIPTION OF THE DRAWINGS

FIGS. 2A through 2D show flow diagrams of example methods for determining authorization for extending a long-term financial contract;

DETAILED DESCRIPTION

Figure 1:
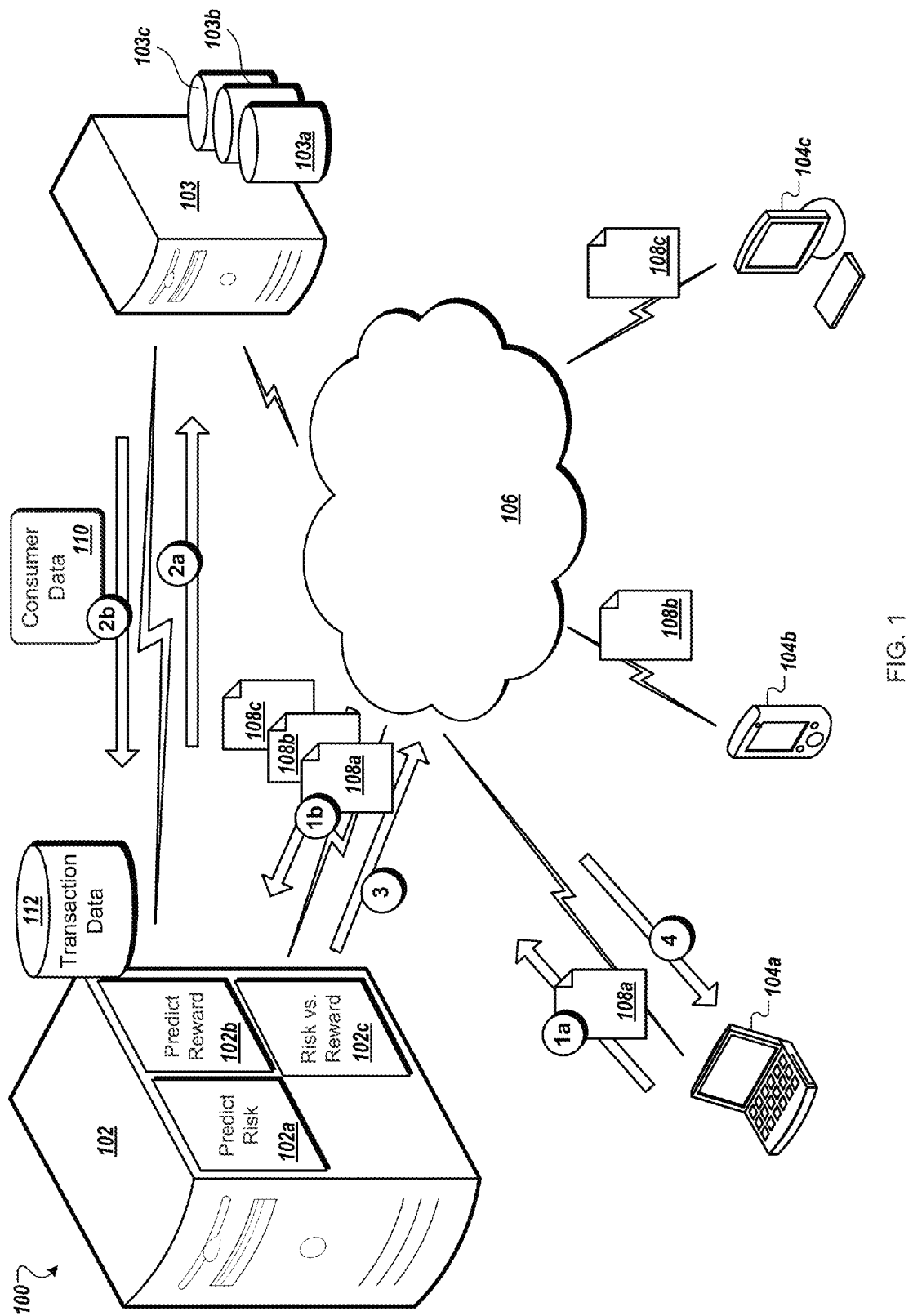
FIG. 1 shows a process diagram of a long-term financial contract authorization process within an example network system.

In some transactions, a broker may incur risk in facilitating the establishment of a long term financial contract commitment. For example, a purchaser may fail to fulfill a commitment to future payments towards the financial contract, causing the broker to incur a loss in relation to the transaction. In some consumer markets, such as home security monitoring, cellular/mobile communications, automobile sales, and furniture sales, a broker may facilitate the establishment of a contract where product or equipment is initially provided to a purchaser at a financial loss to the broker. For example, a purchaser may enter a long term financial contract with a service provider or other entity, represented by the broker, whereby the broker depends upon the purchaser's fulfillment of the long term financial contract with the service provider to derive profit from the transaction.

In the context of the present application, the terms "broker" and "third party" are used interchangeably.

In assessing potential risk of extending an offer for a loan, service contract, or other long term financial contract to an applicant, it may be customary to review the credit worthiness of the applicant. For example, a credit score for the applicant may be obtained from a credit bureau. In another example, a revenue stream of the applicant, such as job income, may be verified prior to extending an offer to the applicant.

In some types of transactions, a third party will sell equipment to a purchaser contingent on the signing of a contract. For example, a retailer (e.g., an electronics or department store), acting as a broker, may sell equipment, e.g., a mobile phone, to a purchaser contingent on the purchaser entering into a contract, e.g., a contract with a service provider to provide services associated with the equipment over a contractual term in return for payments from the purchaser to the service provider. For example, the service provider may be a mobile service provider to provide mobile voice, text, and/or data services for the purchased phone over a period of time, e.g., two years, with periodic, e.g., monthly, payments from the purchaser to the mobile service provider.

Generally, the cost of the equipment is relatively small in comparison to the sum of payments due over the course of the service contract. Since the contractual payments generally provide the largest potential revenue and profit, equipment is often subsidized by being sold below cost, e.g., at a reduced cost or no cost, in exchange for the purchaser entering the service contract. In accordance with this model, the initial losses from the below-cost equipment sale are intended to be recouped from the revenue stream generated by the purchaser's payments under the service contract.

In some arrangements, a third party, e.g., a retailer, obtains the equipment at a cost per unit, then offers the equipment to the purchaser below the cost of each unit, upon the purchaser agreeing to a service contract. Although revenue under the contract generally flows to the service provider, the service provider under such arrangements provide compensation to the third party in exchange for arranging the contract between the purchaser and the service provider.

The compensation to the third party may be provided on the front end of contractual period, or a residual arrangement may be provided whereby the third-party received a stream of payments over the course of the contractual period. Moreover, a hybrid type arrangement may be provided, whereby a relatively large sum is paid to the third party at a particular time (e.g., at or near the beginning of the contractual period), coupled with periodic residual payments.

Generally, if the purchaser fulfills the obligations under the contract, the third party profits, as the compensation from the service provider exceeds any initial losses from the subsidized sale or transfer of the equipment.

A risk arises however, in that the purchaser may not adhere to the contract. For example, the purchaser may not make, or may stop making, payments under the contract for services provided by the service provider. In this circumstance, the service provider may try to collect back payments and/or a contractual cancellation fee to help offset the loss of revenue from ongoing payments. If the service provider is unsuccessful in these efforts, it may sell the contractual debt to a collection agency, often at a small fraction of the outstanding contractual debt. In any event, the lack of payment from the purchaser reduces contractual revenue and may limit, or even eliminate, the compensation provided from the service provider to the third party. Moreover, some arrangements allow for the service provider to require the return from the third party of some or all of the payment or payments the service provider previously made to the third party.

Since the equipment was sold by the third party below cost, net reduction in compensation from the service provider may result in a net loss for the third party. Further, even where the third party covers the initial loss but receives less compensation than expected from the service provider, the overall transaction becomes less beneficial for the third party.

An analogous problem may arise in arrangements outside of the subsidized-equipment in-return-for-service-contract arrangement. For example, an entity, e.g., a company, may provide services to a customer at a reduced cost, or for free, in return for the expectation of future profit. For example, an entity may provide free or reduced-price service to a customer to install a system that utilizes a consumable product, with the expectation that the customer will purchase the consumable products from the company, e.g., on an ongoing basis.

Similarly, an entity may provide reduced-price, or free, services with an expectation of profitable services in the future. For example, an entity may install a system (for example, a home security system) at a reduced installation price, with the expectation that the consumer will continually pay for service (e.g., monitoring service) related to the installation.

In some situations, a combination of goods and services may be provided at a reduced cost, or free, in return for an expectation of future profits. For example, a home security system and installation service may be provided in exchange for an expectation of future payments from the customer. The ongoing service, in this case the monitoring service, may be provided by the installation that sells and/or installs the system or by the provider of the ongoing service.

In some arrangements, free or reduced-price goods may be provided in exchange for an expectation of future purchases related to the free or reduced-price goods. For example, a pod or capsule based beverage system may be provided for free or at reduced cost in exchanged for the expectation of customer purchasing pods or capsules in the future.

Likewise, a product and/or service may be sold at a reduced price, or for free, with an expectation of future profitable purchases of goods from the customer. For example, a home water filtration system may be sold and/or installed by an entity at a reduced cost, or for free, with the expectation that the customer will purchase later products and/or services that profit the entity in the future. For example, the sale of replacement filters, providing a filter replacement service, and/or system maintenance service may provide profit to the entity that offsets and exceeds the costs or profit reduction associated with the initial discounting of the product and/or services.

In this regard, it should be understood that example implementations may be directed to any situation where a party takes a risk in exchange for an expected future profit or benefit.

It should also be understood that although in some examples described herein multiple parties are described as providing the goods and/or services, a single party may provide all of the goods and/or services, and the same party or a different party may execute the exemplary calculations/determinations and/or any other exemplary steps described herein.

In accordance with some example implementations, a system is configured to determine whether a third party should offer and/or enter into long-term financial contract(s) with a customer, in which the third party takes an initial financial loss, e.g., by subsidizing the customer equipment and/or services—e.g., providing the equipment and/or services for free or at a below-cost rate.

In accordance with some example embodiments, the equipment may be a mobile phone or security system installation, where the contract relates to ongoing services related to the equipment (e.g., the mobile voice/text/data service for a phone, or monitoring/response service for the security system). It should be understood that example implementations may be provided for any suitable equipment/contract arrangement and should not be considered limited to the specific examples illustrated herein.

In accordance with some example implementations, information such as customer and transaction information may be gathered and analyzed in order to determine one or more equipment/contract options to approve and present to the customer.

In some example implementations, a follow-on purchase prediction is determined and considered. This prediction may corresponds to the likelihood of the customer purchasing accessories or other follow-on items related to the primary equipment/hardware (e.g., at the time of the primary transaction or thereafter) for the particular purchaser and/or similar purchasers of the particular hardware/contract combination and/or similar hardware/contract combinations. The data may include percentage probability of the particular purchaser making follow-on purchases, an expected monetary amount (e.g., revenue and/or profit) based, for example, on average across particular purchaser's past purchasing behavior and/or past purchasing behavior of similar purchasers for similar products. These purchases may include collateral purchases at contemporaneous with the primary transaction and/or later purchases subsequent to the primary transaction.

In the drawings, like reference characters identify corresponding elements throughout. Further, like reference numbers generally indicate identical, functionally similar, and/or structurally similar elements, except to the extent indicated otherwise.

FIG. 1 illustrates, in accordance with some implementations, a process diagram of a long-term financial contract approval process within an example transaction approval system 100. In brief overview, the transaction approval system 100, in some implementations, may include a transaction server 102 in communication with a number of computing devices 104 over a network 106. The transaction server 102, in some implementations, may accept new transactions 108 submitted on behalf of consumers. The transaction server 102, in some implementations, may assess the new transactions 108 in view of both consumer data 110 related to each of the consumers and historic transaction data regarding a number of transactions related to a number of consumers. Based upon the analysis, in some implementations, the transaction server 102 may make a determination regarding whether to authorize the new transaction based upon the analysis.

The server 102 may also include various engines 102a, 102b, 102c, for, respectively: (1) predicting a risk associated with the third party entering the transaction, (2) predicting a reward or financial benefit to the third party from the transaction; and (3) analyzing both the predicted risk and the predicted reward.

The server 102 is associated with the party that is selling, or providing, the hardware to the purchaser in order to make a more informed decision as to whether or not to extend a particular offer to a particular purchaser. This decision may apply to a single offer or the server 102 may use the information to select one or more offers that the purchaser qualifies for among a group of offers. For example, the server 102, after factoring available data, may determine that the risk and/or risk/reward aspects are acceptable for some equipment/contract combinations, but not others.

The consumer data 110 is provided, in the illustrated example, from a service provider server 103, which is associated with a service provider, e.g., a mobile phone carrier. This data is maintained, for example, in databases 103a, 103b, and 103c. It should be understood that the server 102 and/or the server 103 may obtain consumer data from any suitable source or sources. For example, in accordance with some implementations, the server 102 may obtain creditworthiness information from a credit agency in combination with consumer data 110 obtained from the service provider server 103.

In accordance with example implementations, a consumer accesses a point of sale 104a, 104b, 104c. Although points of sale 104a, 104b, and 104c are illustrated in FIG. 1 as an internet connected laptop computer, an Internet connected mobile device, and an Internet connected desktop, respectively, it should be appreciated that any suitable point of sale at any suitable location may be provided. For example, referring to FIG. 1, the point of sale 104a, 104b, 104c may be a purchaser's personal Internet access device, whereby the purchase process is conducted via the network 106 from the purchaser's home or other location, e.g., via a website hosted by the third party. Further, the point of sale 104a may be property of the third party and may be provided at the location of the third party, e.g., a retail location, whereby the purchaser may provide the information into a connected electronic device or may provide the information to an employee of the third party, who in turn enters the data into a connected electronic device.

Via point of sale 104a, 104b, 104c, the purchaser inputs information 108a, 108b, 108c that includes the purchaser's personal information and purchase information. The personal information may include, for example, the purchaser's name, shipping and billing address, payment mechanism (e.g., credit card data), social security number, and authorization to run a credit report. The purchase information may include, for example, the type of contract the purchaser seeks to enter and the type of products (e.g., specific device(s) and/or class(es) of device) that the purchaser would like receive in connection with the contract.

At step 1a, the information 108a, 108b, 108c is transmitted to the network 106, and at step 1b, the information 108a, 108b, 108c is transmitted to the server 102. Although the information 108a, 108b, 108c may be transmitted directly from the point of sale 104a, 104b, 104c to the server 102 via the network 106, it should be understood that there may be intermediaries involved. For example, some of the information, e.g., social security number or other sensitive information, may be handled by another party which may then communicate relevant corresponding information to the server 102. As another example, payment information may be routed via a payment processing entity. Furthermore, the payment information and/or any other transmitted information described herein may be encrypted and/or sent over a secure connection.

Step 2a represents a query from the third party server 102 to the service provider server 103 for data related to the consumer and/or particular hardware, contract types, and/or hardware/contract combinations, and step 2b represents transmission of the requested data 110 from the service provider server 103 to the third party server 102. The requested information may include information specific to the user based, on, for example, past purchases and/or information corresponding to users similar to the specific user. For example, the information may include information corresponding to historical contractual performance of individuals of similar demographics (e.g., age, gender, income level, and/or residence region) for particular hardware, contracts, and/or hardware/contract combinations. As hardware and contracts change over time, the information may correlate similar prior hardware and contracts (e.g., particular classes, price ranges, contract types, and/or range of contract lengths) as a predictive indicator of similar current hardware and contracts.

Steps 3 and 4 represent communication of data to the consumer or purchaser via network 106. This data may correspond to plans approved and/or not approved by third party. This data may be based on consideration at, e.g., server 102, of various factors based on the information 108a, 108b, 108c from the consumer and the consumer data 110 from the service provider.

FIGS. 2A through 2D are flow diagrams of example methods for scoring or otherwise characterizing a new transaction and determining authorization for extending a long-term financial contract.

Referring to FIG. 2A, a procedure 200 is illustrated. At step 202 transaction data regarding a number of service contracts may be collected by, for example, the server 102 and/or the server 103.

At step 204, historic data related to the transaction data may be derived. This step may be performed by, for example, risk prediction engine 102a and/or reward prediction engine 102b of the server 102.

At step 206, follow-on purchase data related to the transaction data may be derived by, for example, the risk vs. reward analysis engine 102c of the server 102. In some example implementations, the follow-on purchase data may correspond to the likelihood of a consumer purchasing accessories or other follow-on items related to a range of different hardware or classes thereof (e.g., at the time of purchase or thereafter) for various purchaser profiles.

At step 208, a new transaction request related to a consumer may be received by, for example, the server 102. The new transaction request may be a proposed order, or inquiry of approved hardware/contract combinations, from the purchaser.

At step 210, personal data regarding the consumer may be determined. This data may correspond to, e.g., information 108a, 108b, 108c, and 110 described above.

Referring to FIGS. 2B and 2C, there are two procedures 220 and 240 illustrated, respectively. In accordance with various implementations, these procedures 220 and 240 may be performed in parallel, in sequence, or individually without performance of the other.

Referring to FIG. 2B, at step 222 an individual risk score for the consumer or purchaser is determined by, for example, the risk prediction engine 102a of the server 102. This individual risk score may be based upon, for example, credit scores, income levels and/or other purchaser demographics, and/or the purchaser's past purchasing activities.

At step 224, a risk prediction, based upon statistical risk data, may be determined by, for example, the risk prediction engine 102a of the server 102. The statistical data may include any suitable indicators such as for, example, credit history, age, gender, income, public records, and property ownership.

At step 226, a risk score based at least in part on the individual risk score and the risk prediction may be determined.

Referring to FIG. 2C, at step 242 a transaction score for a new transaction is determined. This transaction score may correspond to, for example, the level of compensation the third party stands to receive from the service provider if the contract process is successful. For example, the service provider may supply data to the third party indicating that for particular service plans at particular levels (e.g., amounts of allowed talktime minutes or data usage for a mobile phone), a corresponding level of compensation will be provided in return for brokering the contract between the customer and the service provider. In some example implementations, this compensation level corresponds to the transaction score.

At step 244, a follow-on purchase prediction may be determined from the follow-on purchase data. In some example implementations, the follow-on purchase data corresponds to the likelihood of a consumer purchasing accessories or other follow-on items related to a range of different hardware or classes thereof (e.g., at the time of purchase or thereafter) for various purchaser profiles. In accordance with some example embodiments, statistical analysis may be provided to indicate, based on, e.g., the customer's personal information, that the customer is likely to buy one or more items in addition to the subsidized equipment when completing the transaction.

Thus, in accordance with example embodiments, the transaction score may correspond to a payment in the future (e.g., upon adequate completion of the customer's contractual obligations), and the follow-on purchase prediction may correspond to making money at the time of the transaction or relatively soon afterwards, based upon statistical purchase data.

At step 246, an outcome score for the new transaction may be determined. The outcome score may be determined by, for example, combining the transaction score with the follow-on purchase prediction.

Figure 2D:
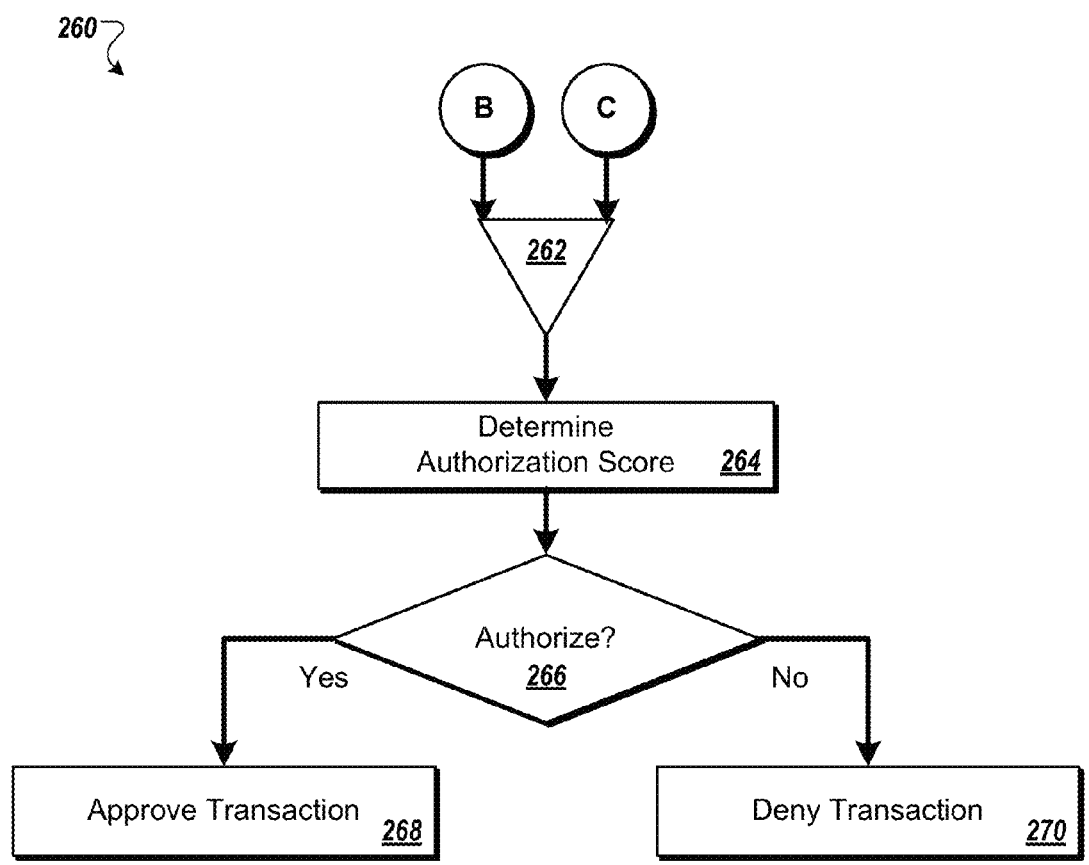

Referring to FIG. 2D, in accordance with some example implementations, the risk score determined at step 226 and the outcome score determined at step 246 may both be utilized as inputs at step 262.

At step 264, an authorization score may be determined based on the risk score and the output score that input at step 262.

Although the example implementation at FIG. 2D shows inputs from the procedures set forth at both FIGS. 2B and 2C, example implementations may provide input at step 262 from either of the respective procedures FIGS. 2B and 2C without input from the other of the respective procedures of FIGS. 2B and 2C. In such examples, whichever of the procedures is not used as an input may be dispensed with, e.g., not performed.

Further, in accordance with example implementations, there may be one or more threshold determinations as to which inputs are utilized. For example, the respective outputs of the procedures of FIGS. 2B and 2C may be analyzed to determine which of the two outputs is more useful for making a transaction decision in a particular case, and using only that output as an input at step 262.

Similarly, in accordance with example implementations, one or more threshold determinations may be made as to whether to utilize as inputs: (a) the output of the procedure of FIG. 2B and not the output of the procedure of FIG. 2C; (b) the output of the procedure of FIG. 2C and not the output of the procedure of FIG. 2B; or (c) both outputs, i.e., the outputs of both the procedure of FIG. 2B and the procedure of FIG. 2C. For example, if one of the outputs (e.g., the risk score or the outcome score) falls within a predetermined range of a mean or average value and the other output falls outside the other output's respective predetermined range with respect to a mean or average value, the system may decide to utilize only the latter output as an input at step 262.

Furthermore, in accordance with example implementations, the inputs are not limited to the outputs of the procedures 220 and 240 of FIGS. 2B and 2C, but may include other inputs, e.g., from other procedures and/or other data.

The procedure 220 may be viewed as an augmented risk analysis. As opposed to using only basic creditworthiness information, the analysis in this example implementation combines creditworthiness data with other predictors including, e.g., statistical risk data analysis and/or personal data.

Similarly, the procedure 240 may be viewed as an augmented outcome analysis. As opposed to examining only the potential compensation from the service provider, the analysis in this example implementation combines the potential compensation with the service provider with a predicted additional monetary benefit due to expected follow-on purchases.

It should be understood that the augmented procedure 220 may be combined at step 262 with a basic outcome analysis (e.g., an outcome score based only considering potential compensation from the service provider). Similarly, the augmented procedure 240 may be combined at step 262 with an output of a basic risk analysis (e.g., a risk score based only on the customer's creditworthiness based on credit ratings).

At step 264, the input or inputs of step 262 may be utilized, e.g., combined, to determine an authorization score.

At step 266, the authorization score determined at step 264 may be utilized to determine whether the particular transaction is approved, as illustrated at step 268, or denied, as illustrated at step 270. This determination may be made, for example, by comparing the authorization score to a threshold, e.g., a predetermined threshold.

Figure 3:
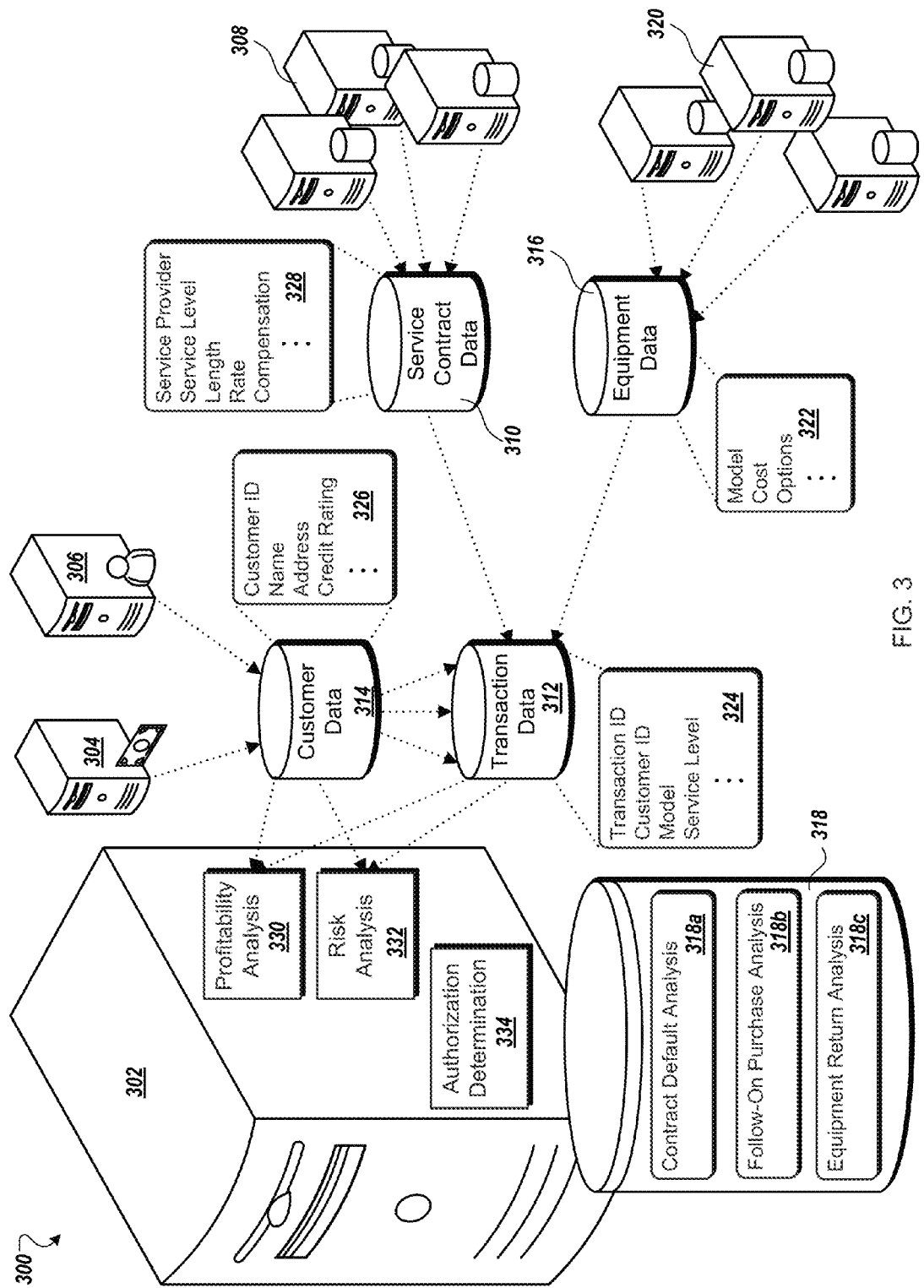
FIG. 3 shows a system diagram of a data analysis system for determining authorization for extending a long-term financial contract.

FIG. 3 shows a system diagram of a data analysis system 300 for determining authorization for extending a long-term financial contract in accordance with the example implementations, e.g., the example methods and procedures set described in detail herein.

A server 302 includes features common to server 102. The server 302 may access transaction data 312. The transaction data 312 in this example implementation may include, referring to 324, transaction identification data, customer identification data, model data corresponding to the particular subsidized hardware, and service data corresponding to the level and terms of the service contract. The service data may include, for example, the amount that a service provider, e.g., a mobile voice and/or data carrier, will compensate the third party for securing the contract.

The service contract data 310 in this example implementation may include, referring to 328, the service provider, the level of service, the length of service, the rate(s) charged for the service, and how the third party is compensated for establishing the contract.

The service contract data may be provided by one or more sources 308, including, e.g., the service provider.

The equipment data 316 in this example implementation may include, referring to 322, the model of the equipment to be potentially sold to the purchaser, the cost of the equipment, and any optional equipment features that may be included.

The equipment data may be provided by one or more sources 320, including, e.g., the service provider and the device manufacturer.

The transaction data 312 in some implementations may be updated to include any accessories that the user purchases, e.g., after ordering the subsidized equipment and accepting the contract. This data may be utilized for future purchases by the same customer or to make predictions with regard to other, e.g., similar, purchasers and/or purchases.

The server 302 may also access customer data 314. The customer data 314 may include, referring to 326, the customer identification data, the customer's name, the customer's address, and the customer's credit rating. This customer data may include data received from the point of sale 304 in a manner the same or analogous to the transmission of customer data from point of sale 104a, 104b, 104c described above with respect to FIG. 1. The customer data may also include data from a credit rating service 306 regarding the customer's creditworthiness.

The customer data 314 in some implementations may also include information related to prior transactions conducted by the customer. For example, this may include prior similar purchases, buying habits, and/or any other suitable prior purchase activity data. This information may be factored into the reward prediction. For example, if the purchaser tends to buy accessories upon making similar purchases, the likelihood of the third party profiting from such accessory purchases on current transaction may be increased.

The customer data 314 in some implementations may also includes background data, e.g., from a background search service, corresponding to the customer. This background data may include, for example, income level, employment history, credit information (e.g., prior defaults, bankruptcies, and/or incidents of reneging on similar contracts), and/or real estate ownership and transactions.

Database 318 shows statistical engines 318a, 318b, 318c of the server 302. The contract default analysis engine 318a determines a likelihood of the purchaser defaulting. This determination may be based on, e.g., the transaction data, customer data, and/or historical data of consumers, e.g., similar consumers, and/or contract/equipment combinations, e.g., similar contract/equipment combinations.

The follow-on purchase analysis engine 318b determines how much, in terms of revenue and/or profit, the third party should expect from potential follow-on purchases (e.g., accessories or other products that the customer may be likely to purchase) at the time of or after acquiring the hardware and entering the contract. This determination may be based on, e.g., the transaction data, customer data, and/or historical data of consumers, e.g., similar consumers, and/or contract/equipment combinations, e.g., similar contract/equipment combinations.

The equipment return analysis engine 318c may determine the likelihood of the customer returning the equipment for any reason. For example, the contract may have a trial period in which the customer may opt to return the equipment and opt out of the contract. This information may be used, for example, in adjusting the potential reward downwardly to account for the potential return.

The statistical engines 318a, 318b, 318c may take that historical transaction data and determine various information based on this data. A profitability analysis engine 330 may use information derived from the follow-on purchase analysis engine in 318b, and the risk analysis engine 332 may take information derived from the contract default analysis engine 318a and the equipment return analysis engine 318c to generate a risk indicator (e.g., a score or other suitable indicator). Based upon the indicators derived by profitability engine 330 and risk analysis engine 332, an authorization determination engine 334 may perform an analysis, e.g., a final analysis, with regard to the potential customer. This analysis may result in a yes-or-no determination for a particular hardware/contract combination and/or may indicate particular hardware/contract combinations and/or classes of hardware/contract combinations which the purchaser is approved to purchase.

Figure 4A:
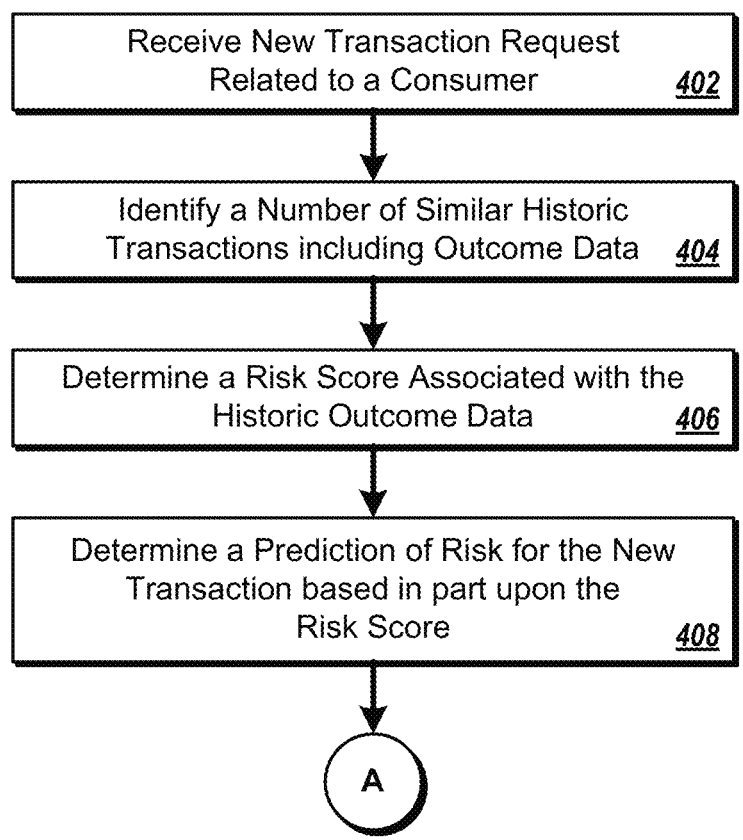
FIGS. 4A through 4C show flow diagrams of additional example methods for determining authorization for extending a long-term financial contract.
Figure 4B:
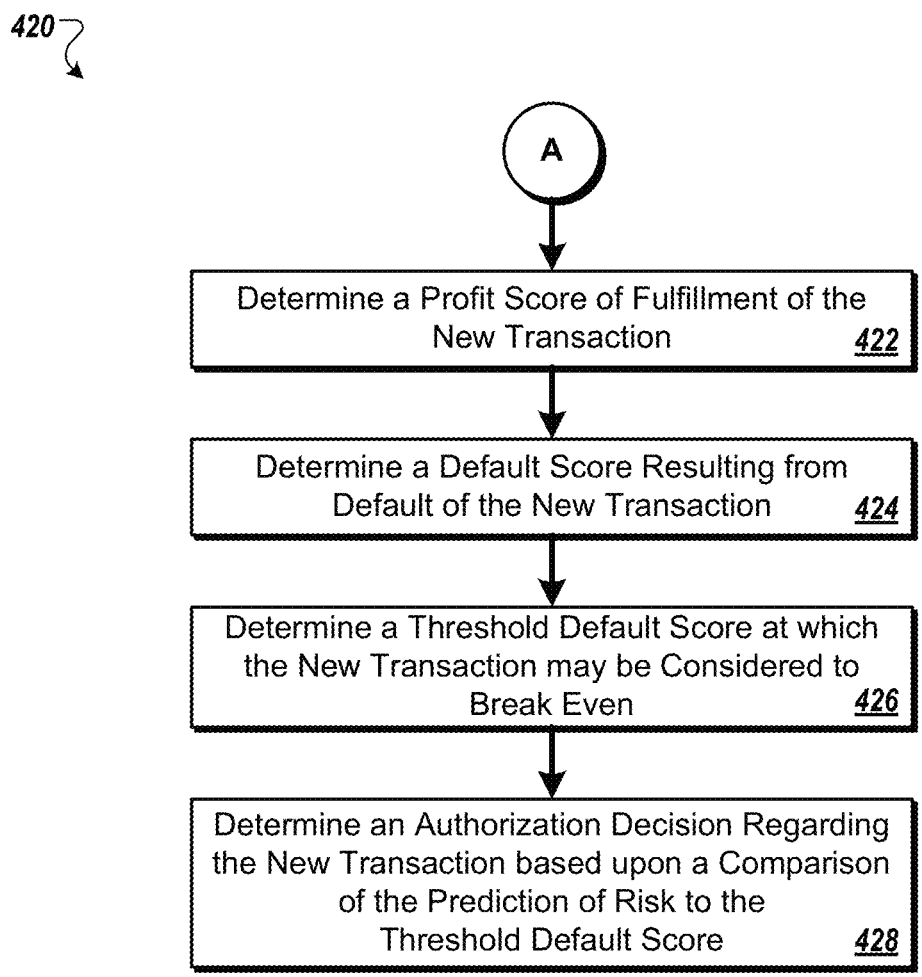
Figure 4C:
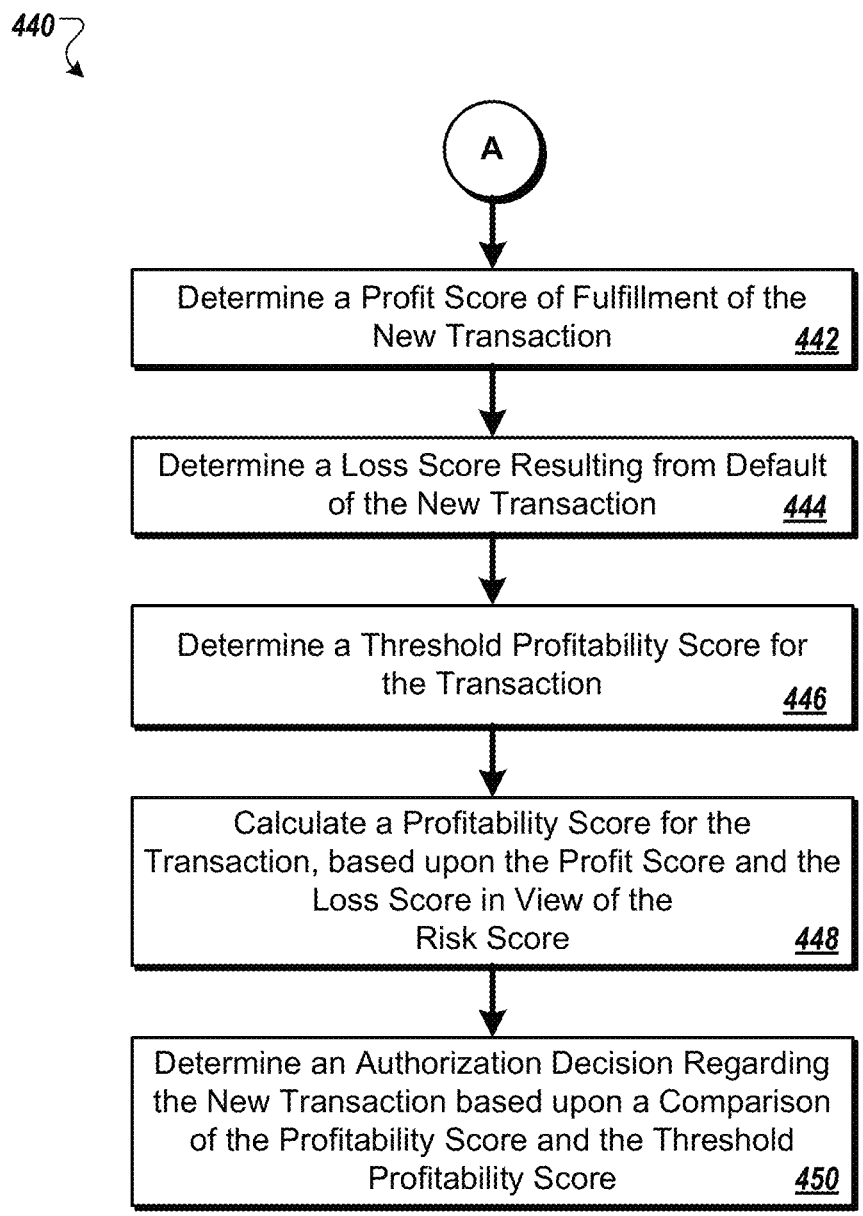

FIGS. 4A through 4C show example implementations for determining authorization for extending a long-term financial contract.

Referring to FIG. 4A, an example procedure 400 provides that, at step 402, a new transaction request related to a consumer or purchaser is received.

At step 404, a number of similar historic transactions including outcome data may be identified. These historic transactions may be based on the purchaser of step 402 and/or other purchasers, e.g., purchasers similar to the purchaser of step 402 (e.g., for purchasers with personal information similar to the purchaser at step 402 or for purchasers with personal information similar to the purchaser at step 402 in transactions involving product(s)/service(s) similar to those requested by the purchaser at step 402).

At step 406 a risk score associated with the historic outcome data identified at step 404 may be identified. This risk score may correspond to a rate of default or other risk identifiers of other individuals, e.g., similar individuals, purchasing equipment/contract combinations, e.g., similar hardware/contract combinations.

At step 408, a prediction of risk for the new transaction may be determined based at least in part on the risk score determined at step 406. For example, the risk score may be combined with additional risk scores associated with other risk indicators, e.g., scores that account for risk indicators obtained from the customer's personal information.

Referring to FIG. 4B, an example procedure 420 provides that, at step 422, a profit score of fulfillment of the new transaction may be determined. The profit score may be derived to reflect, e.g., the potential profit from taking on the customer (e.g., the sum of the compensation provided by the service provider and profits from any additional purchases the customer may make in correspondence with the purchase, minus the cost of subsidizing the hardware).

At step 424, a default score resulting from default of the new transaction may be determined. The default score may be derived to reflect the risk and potential loss in the event that the customer defaults.

At step 426, a threshold default score at which the new transaction may be considered to break even may determined. This score may be determined, e.g., by determining a score at which across all transactions having the score, the average overall profit and loss are zero.

At step 428, an authorization decision regarding the new transaction may be determined based on a comparison of the prediction of risk, determined at step 408 of procedure 400, to the threshold default score, determined at step 426. This authorization decision may utilize the scores in any suitable manner in order to generate a decision. For example, a decision threshold may be set at a predetermined amount above the threshold default score, such that a default score at or above the decision threshold results in approval of the transaction and a default score below the decision threshold results in denial of the transaction.

FIG. 4C illustrates an example procedure 440 which may be utilized as an alternative to the procedure 420 of FIG. 4B.

At step 442, a profit score for fulfillment of the new transaction may be determined. The profit score may be derived to reflect, e.g., the potential profit from taking on the customer (e.g., the sum of the compensation provided by the service provider and profits from any additional purchases the customer may make in correspondence with the purchase, minus the cost of subsidizing the hardware).

At step 444, a loss score resulting from default of the new transaction may be determined. The loss score may be derived to reflect the amount of loss the third party would incur upon a default on the contract.

At step 446, a threshold profitability score for the transaction is determined. This score may be determined such that the expected profit is sufficient to make the transaction desirable to the third party.

At step 448, a profitability score for the transaction may be determined based on the profit score determined at step 442 and loss score determined at step 444 in view of the risk score determined at step 406 of procedure 400 and/or the prediction of risk at step 408 of procedure 400.

At step 450, an authorization decision regarding the new transaction is determined based on a comparison of the profitability score and the threshold profitability score. This authorization decision may utilize the scores in any suitable manner in order to generate a decision. For example, a profitability score at or above the profitability threshold may result in approval of the transaction and a default score below the decision threshold may result in denial of the transaction.

Figure 5:
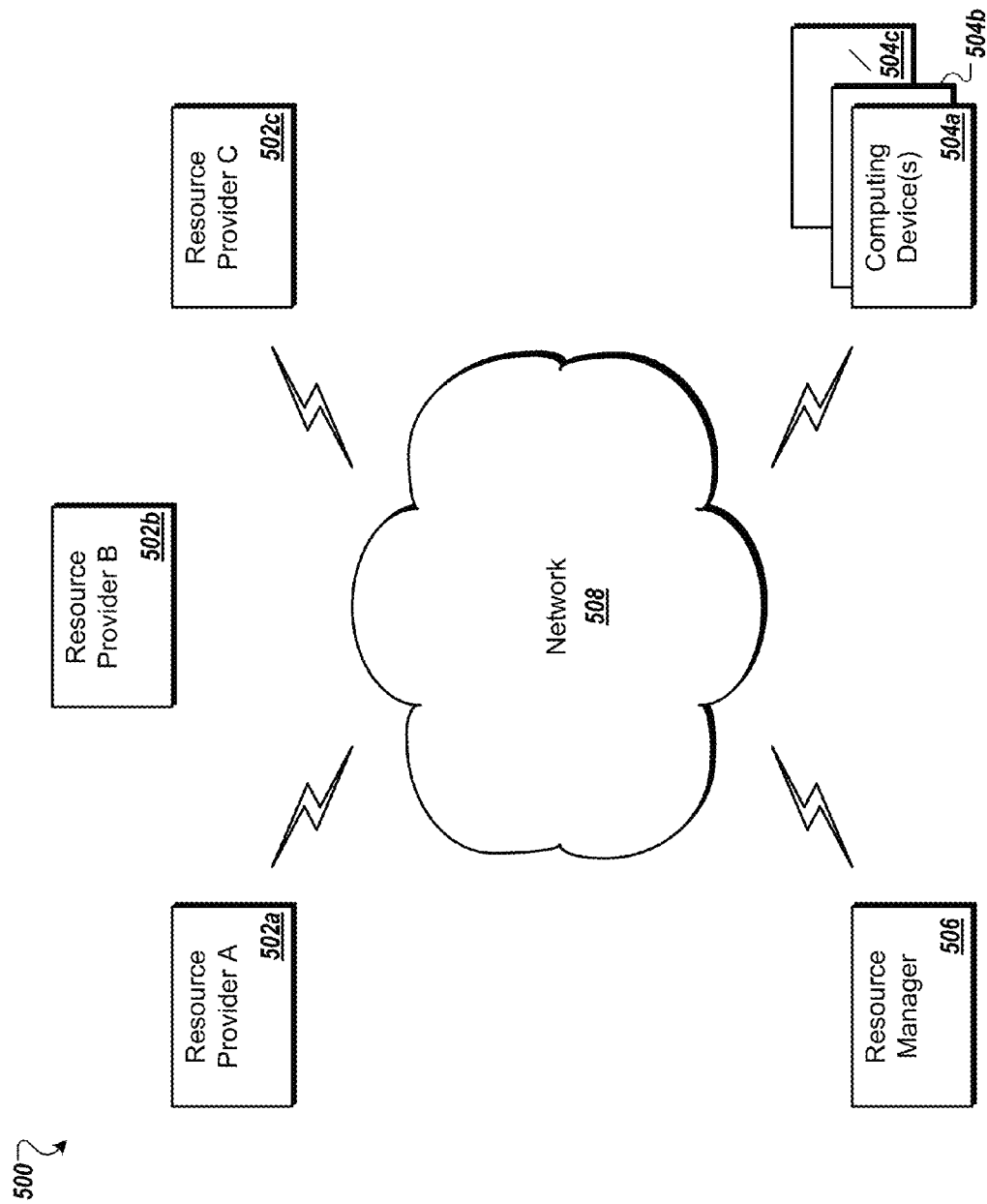
FIG. 5 shows a block diagram of an exemplary cloud computing environment.

As shown in FIG. 5, an implementation of a network environment 500 for assessing consumer purchase behavior in making a financial contract authorization decision is shown and described. In brief overview, referring now to FIG. 5, a block diagram of an exemplary cloud computing environment 500 is shown and described. The cloud computing environment 500 may include one or more resource providers 502*a*, 502*b*, 502*c* (collectively, 502). Each resource provider 502 may include computing resources. In some implementations, computing resources may include any hardware and/or software used to process data. For example, computing resources may include hardware and/or software capable of executing algorithms, computer programs, and/or computer applications. In some implementations, exemplary computing resources may include application servers and/or databases with storage and retrieval capabilities. Each resource provider 502 may be connected to any other resource provider 502 in the cloud computing environment 500. In some implementations, the resource providers 502 may be connected over a computer network 508. Each resource provider 502 may be connected to one or more computing device 504*a*, 504*b*, 504*c* (collectively, 504), over the computer network 508.

The cloud computing environment 500 may include a resource manager 506. The resource manager 506 may be connected to the resource providers 502 and the computing devices 504 over the computer network 508. In some implementations, the resource manager 506 may facilitate the provision of computing resources by one or more resource providers 502 to one or more computing devices 504. The resource manager 506 may receive a request for a computing resource from a particular computing device 504. The resource manager 506 may identify one or more resource providers 502 capable of providing the computing resource requested by the computing device 504. The resource manager 506 may select a resource provider 502 to provide the computing resource. The resource manager 506 may facilitate a connection between the resource provider 502 and a particular computing device 504. In some implementations, the resource manager 506 may establish a connection between a particular resource provider 502 and a particular computing device 504. In some implementations, the resource manager 506 may redirect a particular computing device 504 to a particular resource provider 502 with the requested computing resource.

Figure 6:
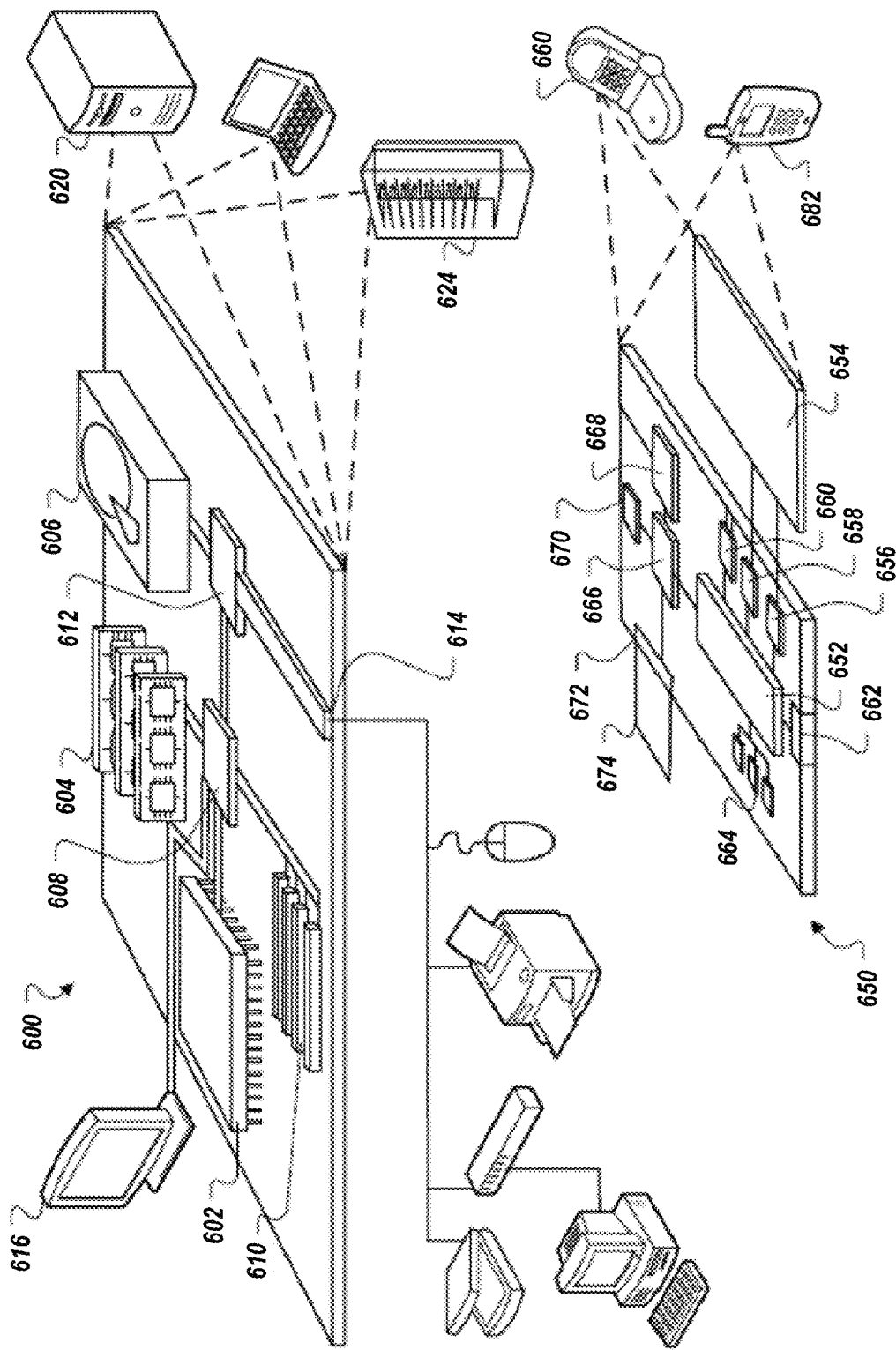
FIG. 6 shows a block diagram of a computing device and a mobile computing device.

FIG. 6 shows an example of a computing device 600 and a mobile computing device 650 that can be used to implement the techniques described in this disclosure. The computing device 600 is intended to represent various forms of digital computers, such as laptops, desktops, workstations, personal digital assistants, servers, blade servers, mainframes, and other appropriate computers. The mobile computing device 650 is intended to represent various forms of mobile devices, such as personal digital assistants, cellular telephones, smartphones, and other similar computing devices. The components shown here, their connections and relationships, and their functions, are meant to be examples only, and are not meant to be limiting.

The computing device 600 includes a processor 602, a memory 604, a storage device 606, a high-speed interface 608 connecting to the memory 604 and multiple high-speed expansion ports 610, and a low-speed interface 612 connecting to a low-speed expansion port 614 and the storage device 606. Each of the processor 602, the memory 604, the storage device 606, the high-speed interface 608, the high-speed expansion ports 610, and the low-speed interface 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as a display 616 coupled to the high-speed interface 608. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 604 stores information within the computing device 600. In some implementations, the memory 604 is a volatile memory unit or units. In some implementations, the memory 604 is a non-volatile memory unit or units. The memory 604 may also be another form of computer-readable medium, such as a magnetic or optical disk.

The storage device 606 is capable of providing mass storage for the computing device 600. In some implementations, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 602), perform one or more methods, such as those described above. The instructions can also be stored by one or more storage devices such as computer- or machine-readable mediums (for example, the memory 604, the storage device 606, or memory on the processor 602).

The high-speed interface 608 manages bandwidth-intensive operations for the computing device 600, while the low-speed interface 612 manages lower bandwidth-intensive operations. Such allocation of functions is an example only. In some implementations, the high-speed interface 608 is coupled to the memory 604, the display 616 (e.g., through a graphics processor or accelerator), and to the high-speed expansion ports 610, which may accept various expansion cards (not shown). In the implementation, the low-speed interface 612 is coupled to the storage device 606 and the low-speed expansion port 614. The low-speed expansion port 614, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. In addition, it may be implemented in a personal computer such as a laptop computer 622. It may also be implemented as part of a rack server system 624. Alternatively, components from the computing device 600 may be combined with other components in a mobile device, such as a mobile computing device 650. Each of such devices may contain one or more of the computing device 600 and the mobile computing device 650, and an entire system may be made up of multiple computing devices communicating with each other.

The mobile computing device 650 includes a processor 652, a memory 664, an input/output device such as a display 654, a communication interface 666, and a transceiver 668, among other components. The mobile computing device 650 may also be provided with a storage device, such as a microdrive or other device, to provide additional storage. Each of the processor 652, the memory 664, the display 654, the communication interface 666, and the transceiver 668, are interconnected using various buses, and several of the components may be mounted on a common motherboard or in other manners as appropriate.

The processor 652 can execute instructions within the mobile computing device 650, including instructions stored in the memory 664. The processor 652 may be implemented as a chipset of chips that include separate and multiple analog and digital processors. The processor 652 may provide, for example, for coordination of the other components of the mobile computing device 650, such as control of user interfaces, applications run by the mobile computing device 650, and wireless communication by the mobile computing device 650.

The processor 652 may communicate with a user through a control interface 658 and a display interface 656 coupled to the display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may provide communication with the processor 652, so as to enable near area communication of the mobile computing device 650 with other devices. The external interface 662 may provide, for example, for wired communication in some implementations, or for wireless communication in other implementations, and multiple interfaces may also be used.

The memory 664 stores information within the mobile computing device 650. The memory 664 may be implemented as one or more of a computer-readable medium or media, a volatile memory unit or units, or a non-volatile memory unit or units. An expansion memory 674 may also be provided and connected to the mobile computing device 650 through an expansion interface 672, which may include, for example, a SIMM (Single In Line Memory Module) card interface. The expansion memory 674 may provide extra storage space for the mobile computing device 650, or may also store applications or other information for the mobile computing device 650. Specifically, the expansion memory 674 may include instructions to carry out or supplement the processes described above, and may include secure information also. Thus, for example, the expansion memory 674 may be provide as a security module for the mobile computing device 650, and may be programmed with instructions that permit secure use of the mobile computing device 650. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. The instructions, when executed by one or more processing devices (for example, processor 652), may perform one or more methods, such as those described above. The instructions can also be stored by one or more storage devices, such as one or more computer- or machine-readable mediums (for example, the memory 664, the expansion memory 674, or memory on the processor 652). In some implementations, the instructions can be received in a propagated signal, for example, over the transceiver 668 or the external interface 662.

The mobile computing device 650 may communicate wirelessly through the communication interface 666, which may include digital signal processing circuitry where necessary. The communication interface 666 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 668 using a radio-frequency. In addition, short-range communication may occur, such as using a Bluetooth, WiFi, or other such transceiver (not shown). In addition, a GPS (Global Positioning System) receiver module 670 may provide additional navigation- and location-related wireless data to the mobile computing device 650, which may be used as appropriate by applications running on the mobile computing device 650.

The mobile computing device 650 may also communicate audibly using an audio codec 660, which may receive spoken information from a user and convert it to usable digital information. The audio codec 660 may likewise generate audible sound for a user, such as through a speaker, e.g., in a handset of the mobile computing device 650. Such sound may include sound from voice telephone calls, may include recorded sound (e.g., voice messages, music files, etc.) and may also include sound generated by applications operating on the mobile computing device 650.

The mobile computing device 650 may be implemented in a number of different forms, as shown in the figure. For example, it may be implemented as a cellular telephone 680. It may also be implemented as part of a smart-phone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse, a trackpad, or a trackball) by which the user can provide input to the computer. Other kinds of devices can be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system may include clients and servers. A client and server are generally remote from each other and typically interact through a communication network. The relationship of client and server arises by virtue of computer programs running on the respective computers and having a client-server relationship to each other.

In view of the structure, functions and apparatus of the systems and methods described here, in some implementations, a system and method for determining authorization for extending a long-term financial contract are provided. Having described certain implementations of methods and apparatus for supporting making a determination regarding authorization for extending a long-term financial contract, it will now become apparent to one of skill in the art that other implementations incorporating the concepts of the disclosure may be used. Moreover, the features of the particular examples and implementations may be used in any combination. Therefore, the disclosure should not be limited to certain implementations, but rather should be limited only by the spirit and scope of the following claims.

What is claimed is:

1. A method comprising:
receiving, via a network from a remote computing device, a request corresponding to a prospective customer for (a) a new service contract and (b) product, wherein
the request comprises customer data specific to the prospective customer and new transaction data,
completion of a new transaction, including the new transaction data, that would be initially unprofitable to a seller, and
the new transaction is anticipated to result in periodic payments to the seller for at least an initial period of time, wherein the periodic payments relate to the service contract;
determining historic data for a plurality of past transactions based at least in part on both demographic information derived from the customer data, and
one or more characteristics of at least one of the new service contract and the product, wherein
the plurality of past transactions are associated with a plurality of individuals different than the prospective customer, and
the historic data for each past transaction of the plurality of past transactions comprises
respective purchaser data,
respective transaction data related to an initial purchase made by a purchaser identified by the purchase data, wherein the initial purchase is determined to be similar to the one or more characteristics, and
respective outcome data comprising at least one of default data regarding a state of completion or default of an associated periodic payment contract, and
return data regarding return of at least a portion of the initial purchase;
determining, by a microprocessor of a computing device, historic risk data related to the plurality of past transactions, wherein the historic risk data reflects an assessment of the outcome data of the plurality of past transactions;
determining, by the microprocessor, a risk prediction of the request, wherein the risk prediction is based at least in part upon the historic risk data;
determining, by the microprocessor, an authorization decision based at least in part upon the risk prediction, wherein the authorization decision comprises an approval or a denial of the request; and
providing, to the remote computing device responsive to the request, an indication of the authorization decision.

2. The method of claim 1, further comprising identifying, by the microprocessor, a risk threshold.

3. The method of claim 2, wherein the risk threshold corresponds at least in part to a value at which an eventual outcome of the completed transaction is expected to result in no profit and no loss.

4. The method of claim 2, further comprising comparing, by the microprocessor, the risk prediction to the risk threshold.

5. The method of claim 4, further comprising determining, by the microprocessor, based at least in part on the comparison of the risk prediction to the risk threshold, that the request should be approved or denied.

6. The method of claim 1, wherein the historic risk data comprises a likelihood of default.

7. The method of claim 1, wherein the risk prediction is based at least in part on a credit score.

8. The method of claim 1, further comprising:
determining, by the microprocessor, follow-on purchase statistical data related to the plurality of past transactions; and
determining, by the microprocessor, a future purchase prediction based at least in part upon the follow-on purchase statistical data.

9. The method of claim 1, further comprising determining, by the microprocessor, a profit estimate of the request.

10. The method of claim 9, wherein determining the profit estimate further comprises estimating future profit based upon the future purchase prediction.

11. The method of claim 1, wherein determining the authorization decision comprises determining a score.

12. The method of claim 1, further comprising determining a cost detriment associated with a potential default of the new service contract.

13. The method of claim 12, wherein
determining the authorization decision comprises determining, by the microprocessor, a maximum probability of default, wherein
the maximum probability of default is a risk ratio comprising the profit estimate and the cost detriment, and
the maximum probability of default comprises a point at which the at least one of (a) the new service contract and (b) sale of the product would at least break even in profitability.

14. The method of claim 13, wherein determining the authorization decision comprises:
determining, by the microprocessor, a minimum acceptable profitability, wherein the minimum acceptable profitability is based at least in part on the profit estimate, the cost detriment, and the risk prediction; and
determining, by the microprocessor, whether the profit estimate is above the minimum acceptable profitability.

15. A method comprising:
collecting, by a microprocessor of a computing device, transaction data for a plurality of past transactions involving purchase of a service contract and subsidized equipment, wherein completion of the purchase was initially unprofitable to a seller, and the purchase resulted in periodic payments to the seller for at least an initial period of time, and wherein the periodic payments relate to the service contract;
collecting, by the microprocessor, return data regarding return of at least a portion of the initial purchase for one or more transactions of the plurality of past transactions;
correlating, by the microprocessor, respective return data with respective transaction data;
collecting, by the microprocessor, periodic payment data for each transaction of at least a portion of past transactions of the plurality of past transactions, wherein the periodic payment data comprises historic data of periodic payments related to the service contract made by the purchaser of each of the portion of past transaction of the plurality of past transactions;
correlating, by the microprocessor, respective payment data with respective transaction data;
accessing, by the microprocessor, information regarding a prospective transaction involving a customer different than a plurality of purchasers associated with the plurality of past transactions, a new service contract, and new subsidized equipment;
matching, by the microprocessor, the prospective transaction with one or more transactions of the plurality of past transactions based at least in part on one or more similarities between respective transaction data related to the respective past transaction and transaction data of the prospective transaction, wherein the one or more similarities include at least two of a) one or more characteristics of the new service contract, b) one or more characteristics of the new subsidized equipment, and c) one or more characteristics of the customer;
analyzing, by the microprocessor, the return data associated with the one or more transactions and the periodic payment data associated with the one or more transactions to determine a risk prediction related to the prospective transaction;
determining, by the microprocessor, an authorization decision based at least in part upon the risk prediction, wherein the authorization decision comprises one of an approval or a denial of the request;
receiving, by the microprocessor, a confirmation that the prospective transaction was completed; and
adding, by the microprocessor, transaction data for the completed transaction to the plurality of past transactions.

16. The method of claim 15, further comprising identifying, by the microprocessor, a risk threshold.

17. The method of claim 16, wherein the risk threshold corresponds at least in part to a value at which the new service contract is expected to generate no profit and no loss.

18. The method of claim 16, further comprising comparing, by the microprocessor, the risk prediction to the risk threshold.

19. The method of claim 18, further comprising determining, by the microprocessor, based at least in part on the comparison of the risk prediction to the risk threshold, that the request should be approved or denied.

20. The method of claim 15, wherein the historic risk data comprises a likelihood of default.

21. The method of claim 15, wherein the risk prediction is based at least in part on a credit score.

22. The method of claim 15, further comprising:
determining, by the microprocessor, follow-on purchase statistical data related to the plurality of past transactions; and
determining, by the microprocessor, a future purchase prediction associated with the prospective transaction based at least in part upon the follow-on purchase statistical data.

23. The method of claim 15, further comprising determining, by the microprocessor, a profit estimate of the request.

24. The method of claim 23, wherein determining the profit estimate further comprises estimating future profit based upon the future purchase prediction associated with the prospective transaction.

25. The method of claim 15, wherein determining the authorization decision comprises determining a score.

26. The method of claim 15, wherein the authorization decision comprises an approval, and wherein the determining of the risk estimate is based further in part upon a compensation amount provided by a service provider in return for authorizing the new service contract.

27. The method of claim 26, wherein the service provider is a consumer telecommunications provider.

28. The method of claim 15, further comprising determining a cost detriment associated with a potential default of the new service contract.

29. The method of claim 26, wherein
   determining the authorization decision comprises determining, by the microprocessor, a maximum probability of default, wherein
      the maximum probability of default is a risk ratio comprising the profit estimate and a cost detriment associated with a potential default of the new service contract, and
      the maximum probability of default comprises a point at which the new service contract would at least break even in profitability.

30. The method of claim 29, wherein determining the authorization decision comprises:
   determining, by the microprocessor, a minimum acceptable profitability, wherein the minimum acceptable profitability is based at least in part on the profit estimate, the cost detriment, and the risk prediction; and
   determining, by the microprocessor, whether the profit estimate is above the minimum acceptable profitability.

\* \* \* \* \*